(12) United States Patent
HIrano

(10) Patent No.: US 6,971,344 B2
(45) Date of Patent: Dec. 6, 2005

(54) INTERNAL COMBUSTION ENGINE

(75) Inventor: Makoto HIrano, Wako (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 22 days.

(21) Appl. No.: 10/380,998

(22) PCT Filed: Sep. 21, 2001

(86) PCT No.: PCT/JP01/08260

§ 371 (c)(1),
(2), (4) Date: Aug. 13, 2003

(87) PCT Pub. No.: WO02/25069

PCT Pub. Date: Mar. 28, 2002

(65) Prior Publication Data

US 2004/0031454 A1 Feb. 19, 2004

(30) Foreign Application Priority Data

Sep. 25, 2000 (JP) .......................................... 2002295423

(51) Int. Cl.[7] ............................. F01L 1/28; F01N 3/02
(52) U.S. Cl. .................. 123/79 C; 123/188.2; 123/85; 60/320
(58) Field of Search .............. 123/188.4, 188.15, 123/188.2, 79 C, 85, 543, 545, 547, 556; 60/320, 321

(56) References Cited

U.S. PATENT DOCUMENTS

| | | | |
|---|---|---|---|
| 3,015,323 A | 1/1962 | Buchi | |
| 4,893,592 A | 1/1990 | Falero | |
| 4,894,995 A | 1/1990 | LaSota | |
| 5,555,859 A | 9/1996 | Melchior et al. | |

FOREIGN PATENT DOCUMENTS

| | | | | |
|---|---|---|---|---|
| CA | 2264186 A1 | 9/2000 | | |
| DE | 3600067 A | * 7/1987 | ............. | F01L/1/28 |
| DE | 3725049 A1 | 8/1988 | | |
| DE | 4002442 A1 | 8/1991 | | |
| DE | 4041724 A1 | 6/1992 | | |
| DE | 4439042 A1 | 3/1995 | | |
| DE | 19523304 A1 | 1/1997 | | |
| DE | 19718710 A1 | 11/1998 | | |
| FR | 2646877 A1 | 11/1990 | | |
| GB | 2 315 519 A | 2/1998 | | |
| JP | 2000-73753 A | 3/2000 | | |
| WO | WO 98/3776 A1 | 1/1998 | | |

OTHER PUBLICATIONS

Patent Abstracts of Japan, vol. 006, No. 043, Mar. 17, 1982 Publication No. 56156407.

* cited by examiner

Primary Examiner—Noah P. Kamen
(74) Attorney, Agent, or Firm—Birch, Stewart, Kolasch & Birch, LLP

(57) ABSTRACT

An internal combustion engine is provided in which an intake valve, which opens and closes an intake valve hole formed in a cylinder head facing a combustion chamber has a hollow structure. An exhaust valve hole formed in the intake valve is made to open and close by an exhaust valve coaxially housed within the intake valve. The intake valve hole communicates directly with an intake port, and the exhaust valve hole coniniunicates with an exhaust port via an exhaust passage formed within the hollow intake valve. This ensures that the intake valve has a large opening area, thus increasing the intake charging efficiency. Furthermore, since exhaust gas coming out of the combustion chamber does not make direct contact with the cylinder head, which has a large heat capacity, any decrease in temperature of the exhaust gas can be minimized, thereby utilizing waste heat effectively.

14 Claims, 12 Drawing Sheets

INTAKE STROKE

EXHAUST STROKE

SIMPLE OPENING AREA = $\pi D^2$

SIMPLE OPENING AREA = $\pi D^2/2$

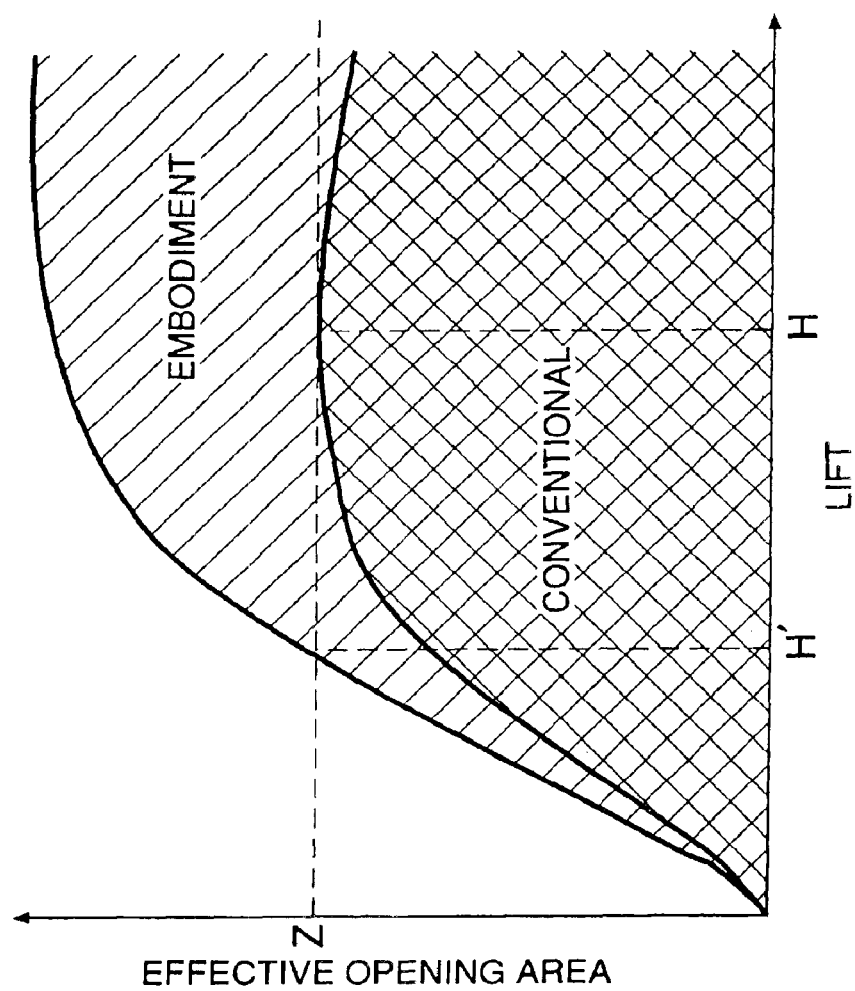

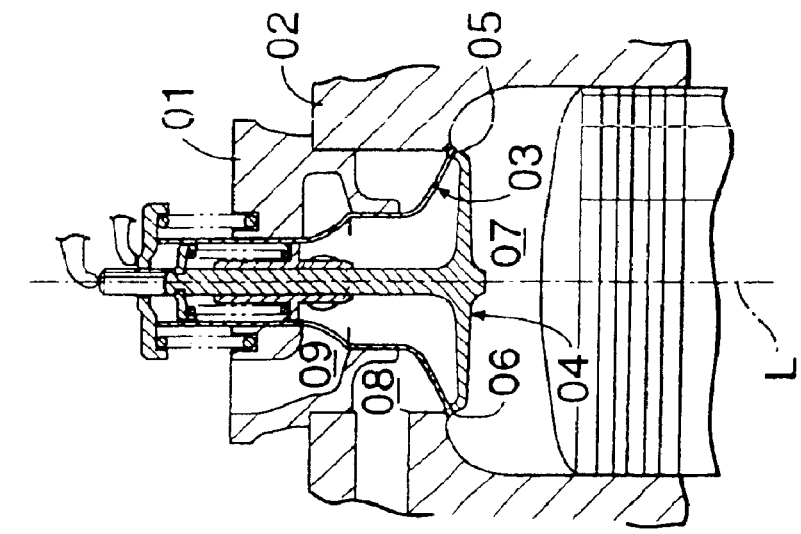
FIG.13A COMPRESSION/EXPANSION STROKES
BACKGROUND ART
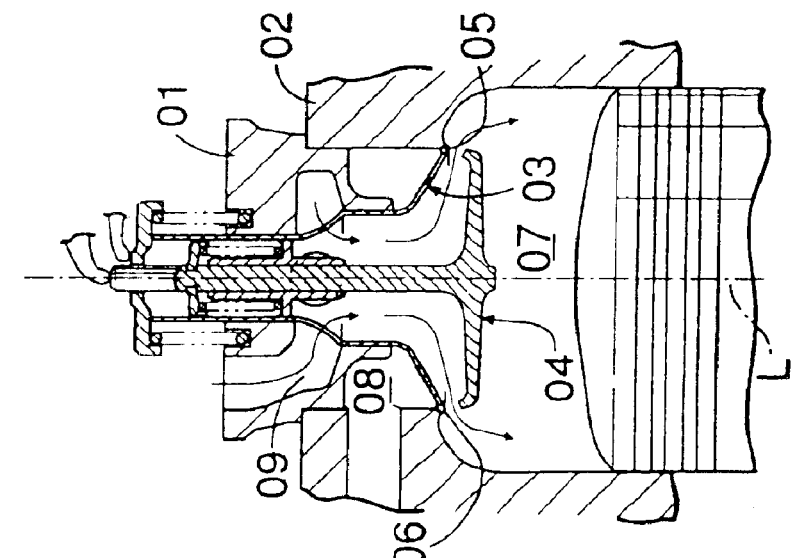
FIG.13B INTAKE STROKE
BACKGROUND ART
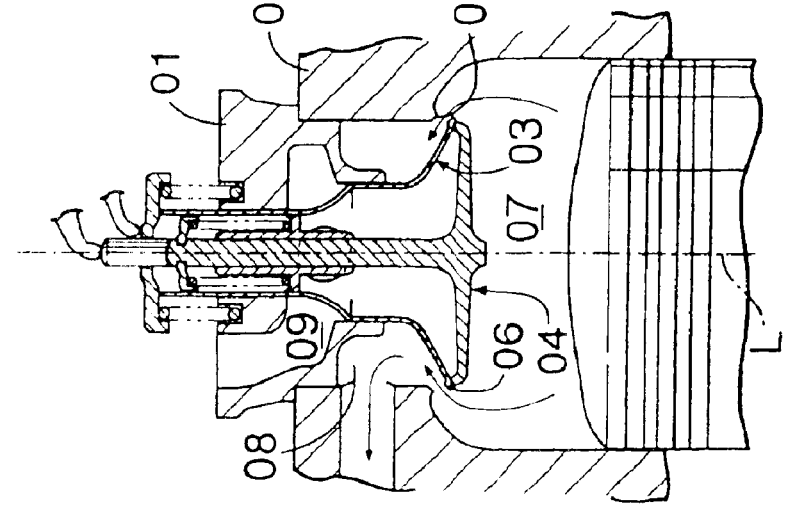
FIG.13C EXHAUST STROKE
BACKGROUND ART

INTERNAL COMBUSTION ENGINE

This application is the national phase under 35 U.S.C. § 371 of PCT International Application No. PCT/JP01/08260 which has an International filing date of Sep. 21, 2001, which designated the United States of America.

FIELD OF THE INVENTION

The present invention relates to an internal combustion engine in which an intake valve and an exhaust valve are coaxially disposed.

BACKGROUND ART

A Panhard internal combustion engine, in which an intake valve and an exhaust valve are coaxially disposed, is disclosed in FIG. 3.27 on page 82 of 'History of the Internal Combustion Engine' (K. Tomizuka, Sanei-shobo Publishing Co., Ltd.)

FIG. 13A to FIG. 13C are schematic diagrams of the structure of the Panhard internal combustion engine. In the Panhard internal combustion engine, a radially outer exhaust valve 03 and a radially inner intake valve 04 are coaxially disposed on a cylinder axis L of a cylinder block 02 joined to a cylinder head 01, the exhaust valve 03 being capable of being seated on an exhaust valve hole 05 formed in the cylinder block 02, and the intake valve 04 being capable of being seated on an intake valve hole 06 formed in the exhaust valve 03. During the compression and expansion strokes shown in FIG. 13A, both the exhaust valve 03 and the intake valve 04 are closed, thus cutting off a combustion chamber 07 from an exhaust port 08 and an intake port 09. During the intake stroke shown in FIG. 13B, the intake valve 04 descends to open the intake valve hole 06, thus providing communication between the combustion chamber 07 and the intake port 09. During the exhaust stroke shown in FIG. 13C, both the exhaust valve 03 and the intake valve 04 descend to open the exhaust valve hole 05, thus providing communication between the combustion chamber 07 and the exhaust port 08.

In this Panhard internal combustion engine, since the diameter of the exhaust valve 03 and the diameter of the intake valve 04 are set so that they are substantially equal to each other, it is necessary to minimize the thickness of the radially outwardly disposed hollow exhaust valve 03, and this reduces the heat capacity of the exhaust valve 03 and degrades the heat resistance, thus causing problems such as deterioration in the durability and deterioration in the sealing properties between the exhaust valve 03 and the exhaust valve hole 05 due to distortion. If the thickness of the exhaust valve 03 is increased in order to solve these problems, then the diameter of the intake valve 04 disposed radially inside the exhaust valve 03 decreases, thus causing the problem of a decrease in the intake charging efficiency.

Furthermore, since the exhaust port 08 connected to the exhaust valve hole 05 is formed directly in the cylinder head 01 and the cylinder block 02, which have a large heat capacity, the exhaust gas coming out of the combustion chamber 07 is deprived of heat by the cylinder head 01 and the cylinder block 02 and its temperature tends to decrease. Because of this, in the case where a heat exchanger is disposed in the exhaust port 08 or downstream thereof, the temperature of the exhaust gas flowing into the heat exchanger is low, thus causing the problem that the efficiency of thermal energy recovery deteriorates.

DISCLOSURE OF THE INVENTION

The present invention has been accomplished in view of the above-mentioned circumstances, and it is an object of the present invention to provide an internal combustion engine that can ensure that an intake valve opening has sufficient area and that can utilize effectively exhaust gas thermal energy.

In order to accomplish this object, in accordance with a first aspect of the present invention, there is proposed an internal combustion engine that includes a cylinder head, a combustion chamber facing the cylinder head, an intake port formed in the cylinder head, an intake valve hole formed in the cylinder head and providing communication between the intake port and the combustion chamber, a hollow intake valve supported in the cylinder head and opening and closing the intake valve hole, an exhaust passage formed axially within the intake valve, an exhaust valve hole formed in the intake valve and providing communication between the exhaust passage and the combustion chamber, an exhaust valve coaxially supported within the intake valve and opening and closing the exhaust valve hole, and an exhaust port formed in the cylinder head and communicating with the exhaust passage.

In accordance with this arrangement, since the exhaust valve is coaxially housed within the hollow intake valve that opens and closes the intake valve hole of the cylinder head and the exhaust valve opens and closes the exhaust valve hole formed in the intake valve, the intake valve hole alone can be opened by making the intake valve and the exhaust valve descend as a unit, and the exhaust valve alone can be opened by making the exhaust valve descend independently. Furthermore, since it is possible to set the diameter of the radially outwardly disposed intake valve hole so that it is larger than the diameter of the radially inwardly disposed exhaust valve hole and so that it is nearly the same as the inner diameter of the combustion chamber, a large opening area can be ensured for the intake valve, and the intake charging efficiency can be increased compared with a conventional internal combustion engine in which an intake valve and an exhaust valve are disposed on separate axes, or the Panhard internal combustion engine in which the radially outer exhaust valve and the radially inner intake valve are disposed coaxially. As a result, the lift of the intake valve required to ensure a predetermined opening area can be decreased, and the driving force for the intake valve can be reduced. Moreover, since the exhaust gas that has just come out of the combustion chamber is guided into the exhaust port through the exhaust passage formed within the hollow intake valve, which has a small heat capacity, without making direct contact with the cylinder head, which has a large heat capacity, the decrease in temperature of the exhaust gas can be minimized, thereby utilizing waste heat effectively.

Furthermore, in accordance with a second aspect of the present invention, in addition to the first aspect, there is proposed an internal combustion engine that further includes a heat exchanger disposed in the exhaust port.

In accordance with this arrangement, since the heat exchanger is disposed in the exhaust port connected to the downstream side of the exhaust passage formed within the hollow intake valve, which has a small heat capacity, high temperature exhaust gas can be supplied to the heat exchanger, thereby maximizing the efficiency of waste heat recovery.

An evaporator 39 of embodiments corresponds to the heat exchanger of the present invention.

BRIEF DESCRIPTION OF DRAWINGS

FIG. 1 to FIG. 8 illustrate a first embodiment of the present invention;

FIG. 1 is a vertical cross section of a cylinder head part of an internal combustion engine;

FIG. 2 is a cross section along line 2—2 in FIG. 1;

FIG. 3 is a cross section along line 3—3 in FIG. 1;

FIG. 4 is a cross section along line 4—4 in FIG. 1;

FIG. 5 is a view from line 5—5 in FIG. 1;

FIG. 8 is a graph showing the relationship between the lift and the opening area of the intake valve;

FIG. 11 is a vertical cross section of a cylinder head part of an internal combustion engine;

FIG. 12 is a cross section along line 12—12 in FIG. 11; and

FIG. 13A to FIG. 13C are diagrams for explaining the structure and operation of a Panhard internal combustion engine.

BEST MODES FOR CARRYING OUT THE INVENTION

Figure 1:
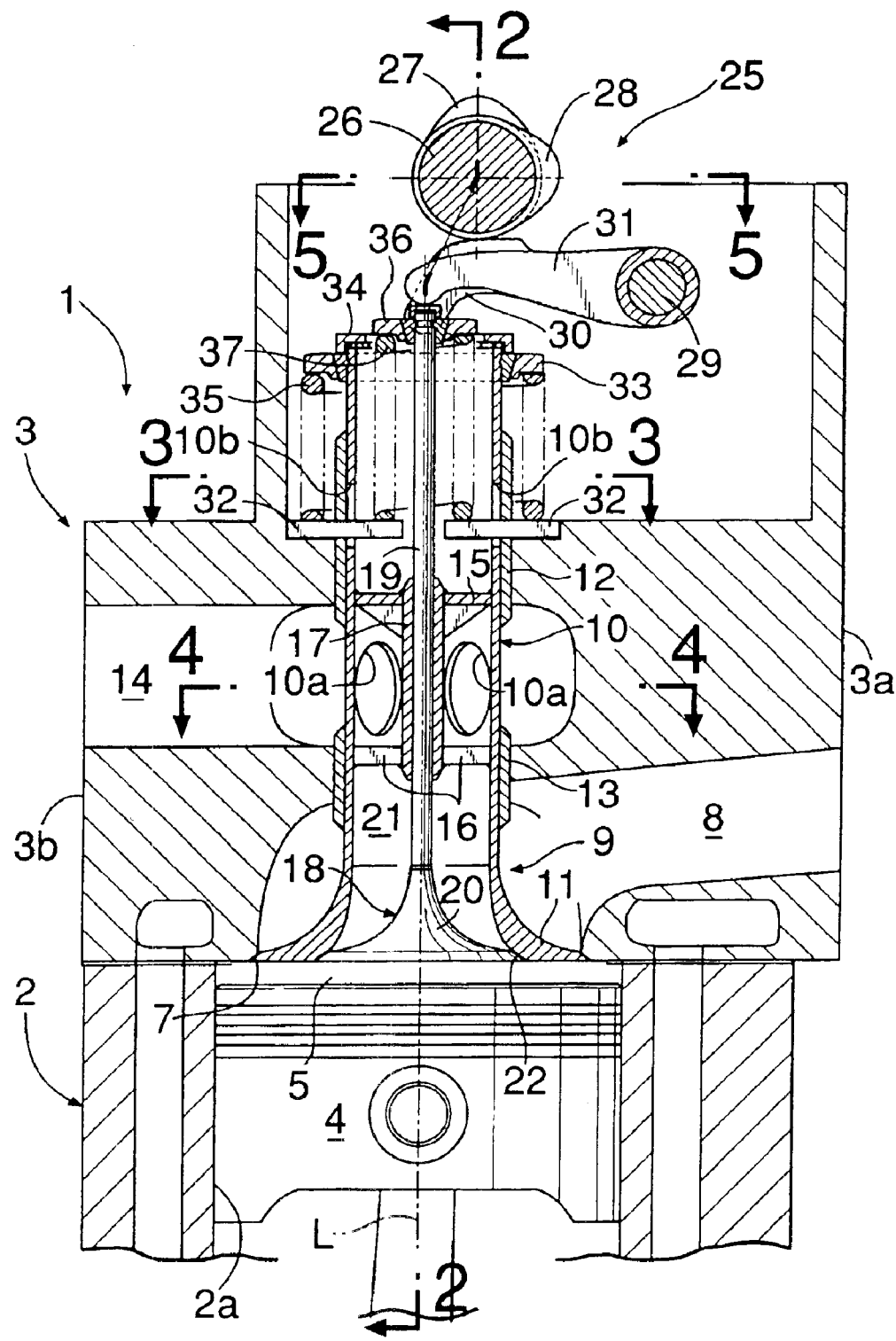
Figure 2:
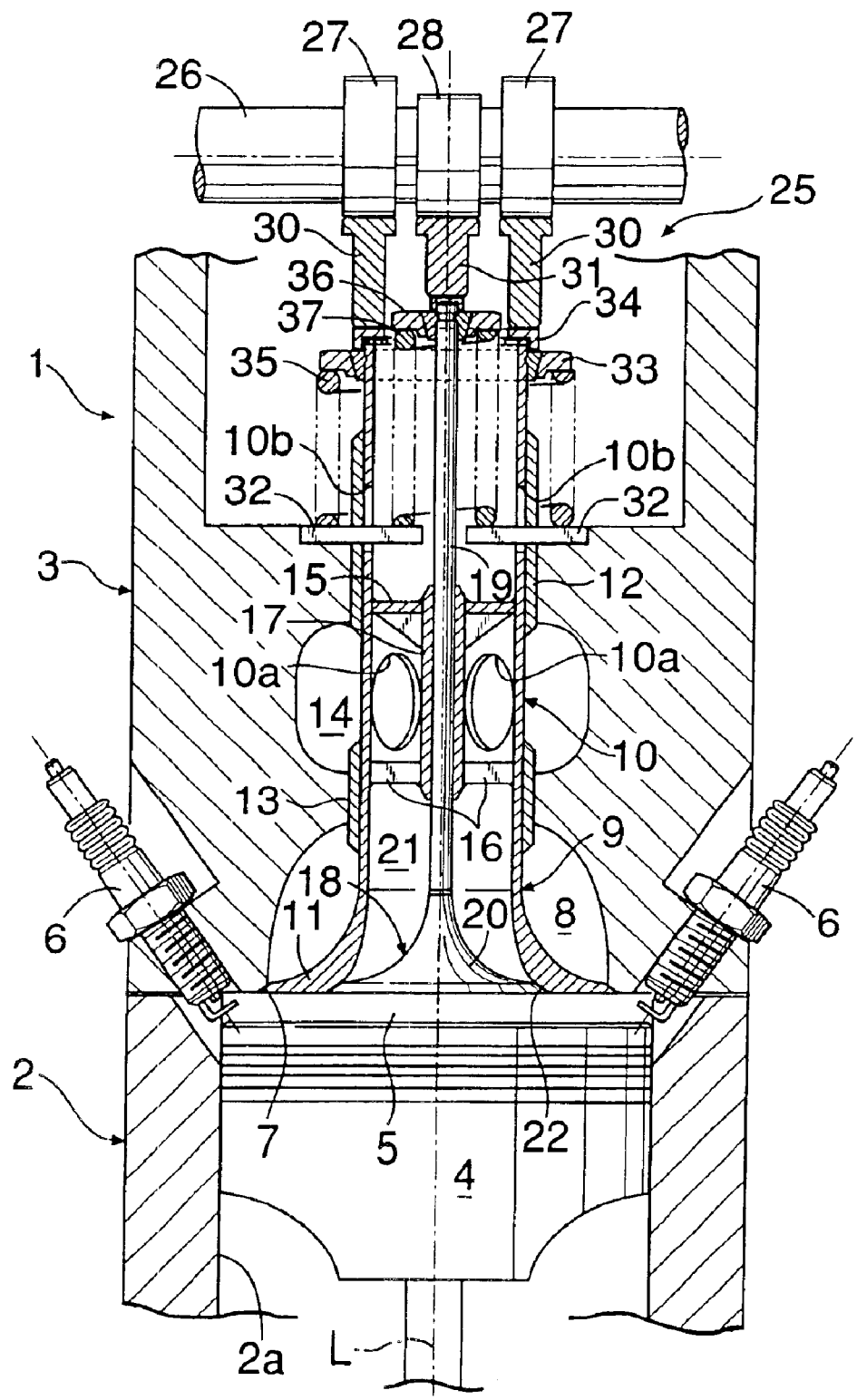
Figure 3:
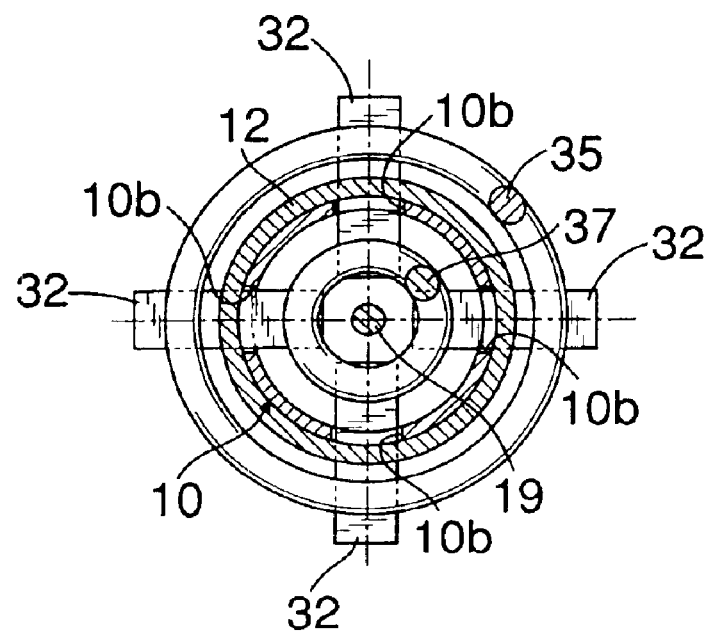
Figure 4:
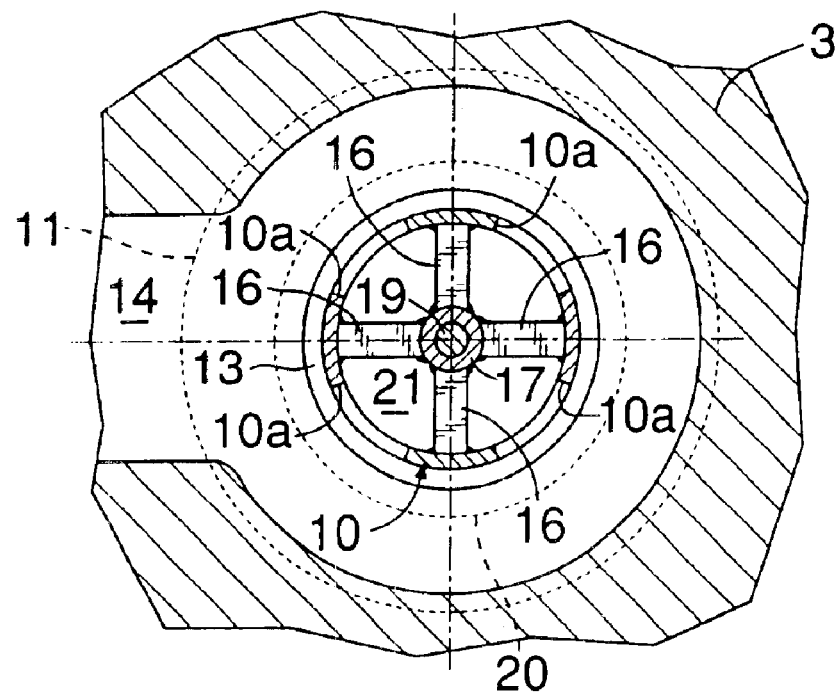
Figure 5:
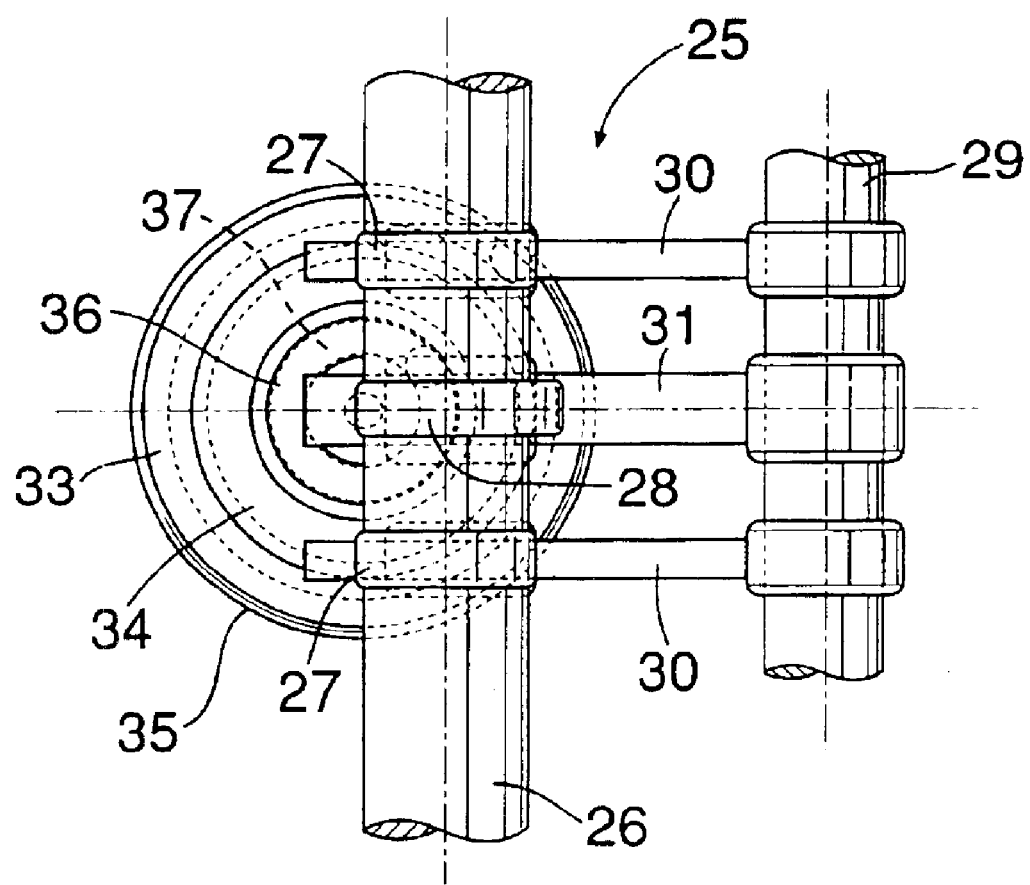

The first embodiment of the present invention is explained below by reference to FIG. 1 to FIG. 8.

As shown in FIG. 1 to FIG. 5, a single-cylinder four-stroke internal combustion engine 1 includes a cylinder block 2 and a cylinder head 3 joined to the upper face of the cylinder block 2, and a combustion chamber 5 is formed between the lower face of the cylinder head 3 and the upper face of a piston 4 that is slidably fitted in a cylinder bore 2a. A pair of spark plugs 6 are screwed into the cylinder head 3, and their tips face the combustion chamber 5. A circular intake valve hole 7 that is coaxial with a cylinder axis L is formed in the lower face of the cylinder head 3, and an intake port 8 extending from the intake valve hole 7 runs through the interior of the cylinder head 3, and opens on one side 3a of the cylinder head 3.

An intake valve 9 includes a stem 10 and a head 11, the stem 10 being in the form of a tube and having a circular cross-section, and the head 11 extending radially outward from the lower end of the stem 10. The upper face of the outer peripheral part of the head 11 faces the intake valve hole 7 of the cylinder head 3 and can be seated thereon. Provided within the cylinder head 3 coaxially with the cylinder axis L are a pair of upper and lower intake valve guides 12, 13 supporting the stem 10 of the intake valve 9 in a vertically slidable manner, and formed on the stem 10 are a plurality of (for example, four) through holes 10a. The upstream side of an exhaust port 14, which opens on the other side 3b of the cylinder head 3, extends around and between the lower edge of the upper intake valve guide 12 and the upper edge of the lower intake valve guide 13, and communicates with the through holes 10a of the stem 10 of the intake valve 9.

An exhaust valve guide 17 is supported within the stem 10 of the intake valve 9 coaxially with the cylinder axis L via an upper support member 15 and lower support members 16. The upper support member 15 is an annular member and is fixed to the inner periphery of the stem 10 and the outer periphery of the exhaust valve guide 17. The lower support members 16 are a plurality of (for example, four) rodlike members, are disposed radially around the cylinder axis L, and provide connections between the inner periphery of the stem 10 and the outer periphery of the exhaust valve guide 17.

An exhaust valve 18 includes a stem 19 and a head 20; the stem 19 is slidably supported by the exhaust valve guide 17, and the head 20 can be seated on an exhaust valve hole 22 at the lower end of an exhaust passage 21 formed within the intake valve 9. The combustion chamber 5 can therefore communicate with the exhaust port 14 via the exhaust valve hole 22, the exhaust passage 21 formed within the stem 10 of the intake valve 9, spaces formed between the four lower support members 16, and the four through holes 10a. The exhaust gas within the exhaust passage 21 is blocked from leaking upward by the upper support member 15.

A valve operating mechanism 25 disposed in an upper part of the cylinder head 3 includes a camshaft 26 rotatable in association with a crank shaft (not illustrated), a pair of intake cams 27 fixed to the camshaft 26, an exhaust cam 28 fixed to the camshaft 26 between the two intake cams 27, a pair of intake rocker arms 30 pivotably supported on a rocker arm shaft 29 and driven by the intake cams 27, and an exhaust rocker arm 31 pivotably supported on the rocker arm shaft 29 and driven by the exhaust cams 28.

A plurality of (for example, four) openings 10b are formed at positions above the upper support member 15 on the stem 10 of the intake valve 9, and four lower spring seats 32 passing loosely through these openings 10b and passing through the upper intake valve guide 12 are supported on the upper face of the cylinder head 3. An annular first upper spring seat 33 is fitted around the upper end of the stem 10; furthermore, an annular cam follower 34 is fixedly fitted around the upper end of the stem 10, and an intake valve spring 35 is provided in a compressed state between the lower spring seats 32 and the first upper spring seat 33. Furthermore, a second upper spring seat 36 that can pass through the interior of the annular cam follower 34 is fixed to the upper end of the stem 19 of the exhaust valve 18, and an exhaust valve spring 37 is provided in a compressed state between the second upper spring seat 36 and the lower spring seats 32. The intake valve spring 35 biases the intake valve 9 in a valve closing direction so as to seat the head 11 thereof on the intake valve hole 7, and the exhaust valve spring 37 biases the exhaust valve 18 in a valve closing direction so as to seat the head 20 thereof on the exhaust valve hole 22.

The operation of the embodiment of the present invention having the above-mentioned arrangement is now explained.

During the compression stroke and the expansion stroke shown in FIG. 1, the circular base parts of the intake cams 27 and the exhaust cam 28 abut against the intake rocker arms 30 and the exhaust rocker arm 31, the intake valve 9 is biased upward along the intake valve guides 12, 13 by the intake valve spring 35 pushing the first upper spring seat 33, thus seating the head 11 of the intake valve 9 on the intake valve hole 7, the exhaust valve 18 is biased upward along the exhaust valve guide 17 by the exhaust valve spring 37 pushing the second upper spring seat 36, thus seating the head 20 of the exhaust valve 18 on the exhaust valve hole 22, and as a result the combustion chamber 5 is cut off from the intake port 8 and the exhaust port 14.

Figure 6A:
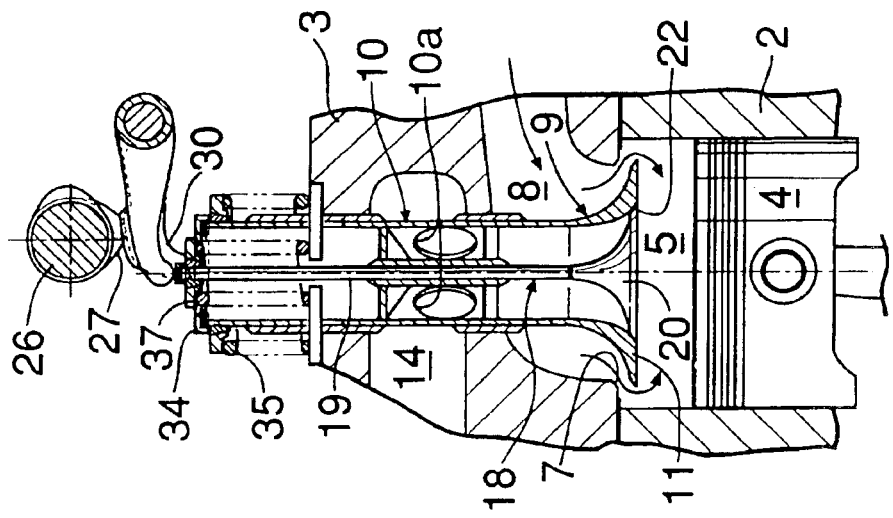
FIG. 6A and FIG. 6B are diagrams for explaining the operation of the intake stroke and the exhaust stroke respectively.
Figure 6B:
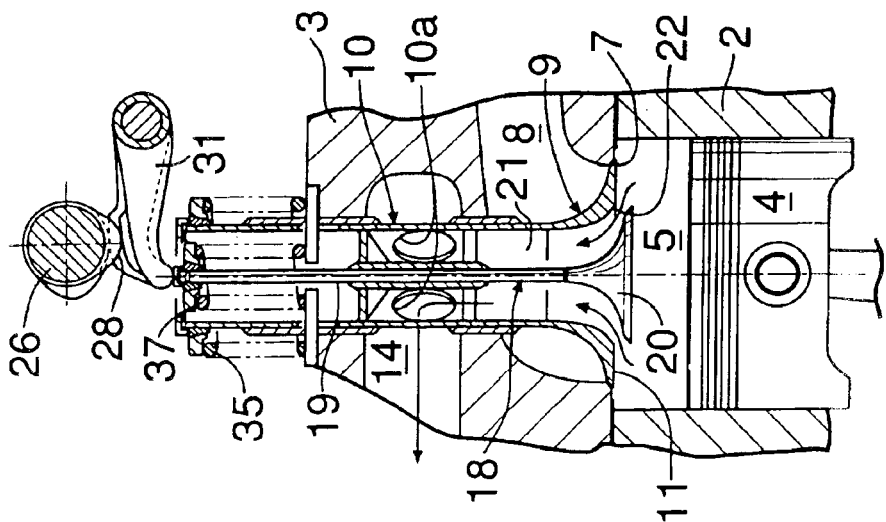

During the intake stroke shown in FIG. 6A, the intake cams 27 push the cam follower 34 via the intake rocker arms 30 so as to push down the intake valve 9 against the intake valve spring 35, the head 11 of the intake valve 9 becomes detached from the intake valve hole 7, and as a result the intake port 8 is made to communicate with the combustion chamber 5, thus introducing fresh gas into the cylinder bore 2a. At this point, since the exhaust valve 18 descends together with the intake valve 9 against the exhaust valve spring 37 and the head 20 of the exhaust valve 18 is seated on the exhaust valve hole 22 of the intake valve 9, the intake valve hole 7 is not opened. During the exhaust stroke shown in FIG. 6B, the exhaust cam 28 pushes the upper end of the stem 19 via the exhaust rocker arm 31 so as to push down the exhaust valve 18 against the exhaust valve spring 37, the head 20 of the exhaust valve 18 becomes detached from the exhaust valve hole 22, and as a result the combustion chamber 5 is made to communicate with the exhaust port 14 via the exhaust valve hole 22, the exhaust passage 21, and the through holes 10a.

In this way, as in the conventional internal combustion engine, the intake stroke, the compression stroke, the expansion stroke, and the exhaust stroke can be carried out sequentially with rotation of the camshaft 26.

Figure 7B:
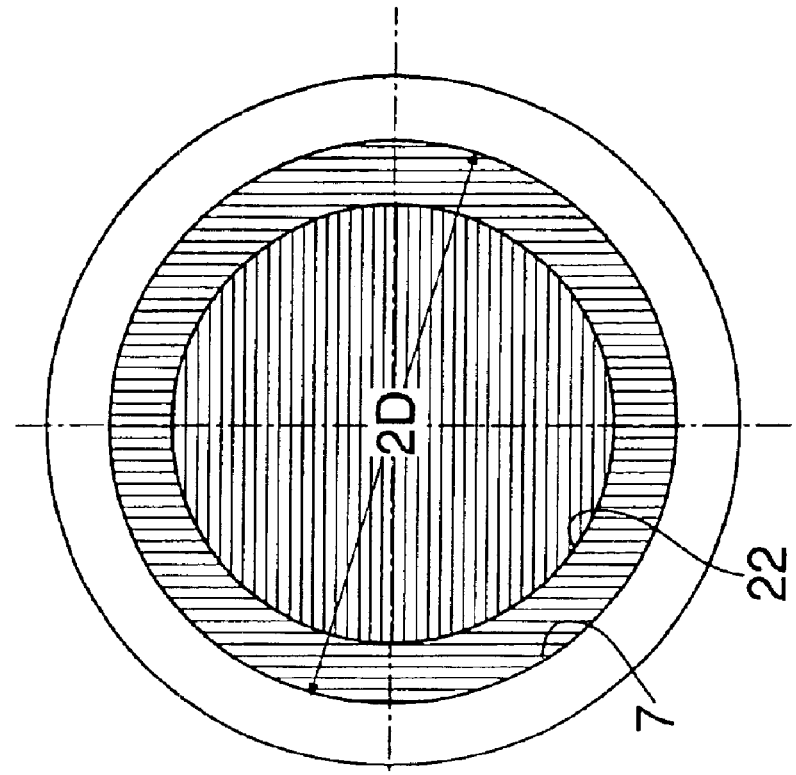
FIG. 7B is a diagram for explaining the opening area of an intake valve in this embodiment.
Figure 7A:
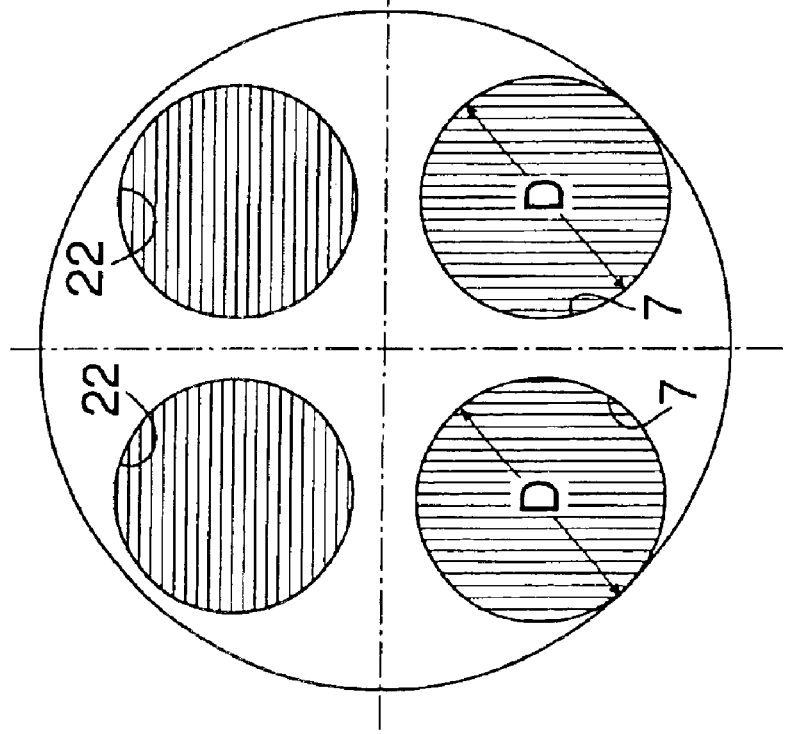
FIG. 7A is a diagram for explaining the opening area of a conventional intake valve.

FIG. 7A and FIG. 7B schematically illustrate a conventional case in which two intake valve holes 7 and two exhaust valve holes 22 are disposed on separate axes, and the embodiment in which one intake valve hole 7 and one exhaust valve hole 22 are coaxially disposed. When the diameter of each of the conventional exhaust valve holes 22 is D and the diameter of the intake valve hole 7 in the embodiment is 2D, the total of the simple opening areas of the two conventional intake valve holes 7 is $\pi D^2/2$ based on a calculation using the hole diameter, and the simple opening area of the intake valve hole 7 in the embodiment is $\pi D^2$, thus making it possible to ensure that the simple opening area in the embodiment is twice that of the conventional case. In the arrangements described in FIG. 7A and FIG. 7B, the diameter of the intake valve hole 7 in the embodiment is slightly smaller than 2D, and the simple opening area is slightly less than twice that of the conventional case.

FIG. 8 shows a comparison between the conventional case and the embodiment with respect to the effective opening area calculated from the lift of the intake valve 9 and the actual flow rate of the intake valve hole 7. As is clear from this figure, in order to obtain an effective opening area Z, the lift of the intake valve 9 in the conventional case is H whereas the lift of the intake valve in the embodiment is only H', which is approximately one half of H.

As hereinbefore described, in accordance with the arrangement in which the intake valve 9 is disposed radially outside the exhaust valve 18, it is possible to ensure that the intake valve hole 7 has a large opening area compared with the conventional internal combustion engine in which the intake valve and the exhaust valve are disposed on separate axes and also compared with the Panhard internal combustion engine (see FIG. 13A to FIG. 13C) in which the intake valve is disposed radially inside the exhaust valve. As a result, it becomes possible to reduce the lift of the exhaust valve 9 needed for ensuring a required opening area, thus reducing the drive torque of the camshaft 26 and thereby contributing to a reduction in the fuel consumption.

Furthermore, the high temperature exhaust gas that has just come out of the combustion chamber 5 is guided to the exhaust port 14 of the cylinder head 3 via the exhaust passage 21 formed inside the stem 10 of the intake valve 9 without making direct contact with the cylinder head 3, which has a large heat capacity. Since the stem 10 forming the exhaust passage 21 is thin, has a very small heat capacity, and is only supported in the cylinder head 3 by the intake valve guides 12, 13, which have a small area, it is possible to effectively prevent the exhaust gas from being deprived of heat by the cylinder head 3. Because of this, when a so-called heat exchanger that includes a waste heat recovery system such as an evaporator or a thermoelectric device is provided in the exhaust port 14 or an exhaust pipe downstream of the exhaust port 14, the exhaust gas can be supplied to the heat exchanger while minimizing any temperature decrease, thereby enhancing the efficiency of waste heat recovery.

Moreover, since a lower part of the exhaust passage 21 through which high temperature exhaust gas passes faces the intake port 8 via the wall of the intake valve 9, which is made in the shape of a thin tube, heat exchange is carried out between the high temperature exhaust gas and low temperature fresh gas, thus promoting atomization of fuel passing through the intake port 8 and also cooling of the head 11 of the intake valve 9, thereby prolonging its lifetime. Furthermore, since the head 20 of the exhaust valve 18, which is exposed to high temperature exhaust gas, is seated on the exhaust valve hole 22 formed in the head 11 of the intake valve 9, which is cooled by fresh gas, the head 20 of the exhaust valve 18 can be cooled indirectly by the fresh gas, thus prolonging its lifetime. The above-mentioned arrangement can eliminate the necessity for making in particular the exhaust valve 18, which requires super high heat resistance, of a super high heat resistant alloy, thereby contributing to a reduction in cost.

Moreover, since the flow of fresh gas that is taken into the combustion chamber 5 and the flow of exhaust gas that is discharged from the combustion chamber 5 have axial symmetry relative to the cylinder axis L, it is possible to prevent retention of the fresh gas and the exhaust gas due to drifting, and the gases can be swept in an ideal manner, thereby increasing the intake and exhaust efficiencies. Whereas in the conventional internal combustion engine in which the intake valve and the exhaust valve are disposed on separate axes there is the phenomenon of fresh gas or exhaust gas being prevented from flowing smoothly through the exhaust valve hole or a section where the exhaust valve hole is close to the wall of the cylinder bore, thereby degrading the intake and exhaust efficiencies, in the present embodiment since the distances of the intake valve hole 7 and the exhaust valve hole 22 from the wall of the cylinder bore 2a are kept constant, the degradation of the intake and exhaust efficiencies can be avoided.

Moreover, compared with the conventional internal combustion engine in which the intake valve and the exhaust valve are disposed on separate axes, since the valve operating mechanism 25 can be arranged in a compact manner immediately above the cylinder head 3, it is possible to easily secure a space for other members to be arranged around the periphery of the cylinder head 3.

Figure 9:
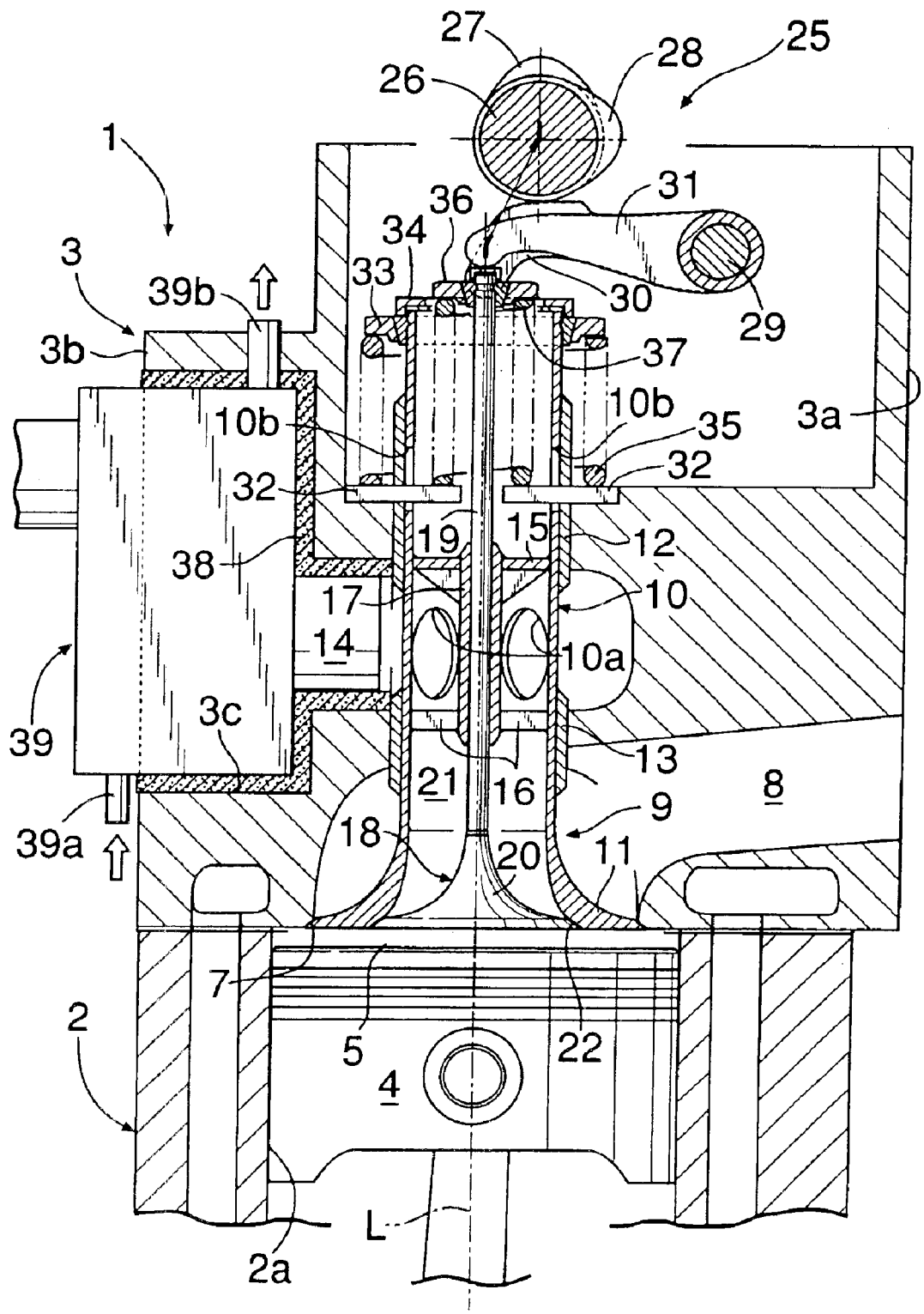
FIG. 9 is a vertical cross section of a cylinder head part of an internal combustion engine related to a second embodiment.

A second embodiment of the present invention is now explained by reference to FIG. 9.

In an internal combustion engine 1 of the second embodiment, an evaporator 39 is supported, via a heat insulator 38, in a recess 3c formed on a side 3b of a cylinder head 3. The evaporator 39, which functions as a heat exchanger, is used in, for example, a Rankine cycle system for converting the thermal energy of exhaust gas of the internal combustion engine 1 into mechanical energy; heat exchange is carried out between the exhaust gas and a liquid phase working medium supplied through an inlet 39a, and vapor generated by heating the liquid phase working medium is discharged through an outlet 39b.

As has already been explained for the first embodiment, since the high temperature exhaust gas that has just come out of a combustion chamber 5 is guided to an exhaust port 14 via an exhaust passage 21, which has a small heat capacity, without making direct contact with the cylinder head 3, which has a large heat capacity, the exhaust gas can be supplied to the evaporator 39 while minimizing any decrease in temperature, thereby increasing the efficiency of waste heat recovery.

Figure 10:
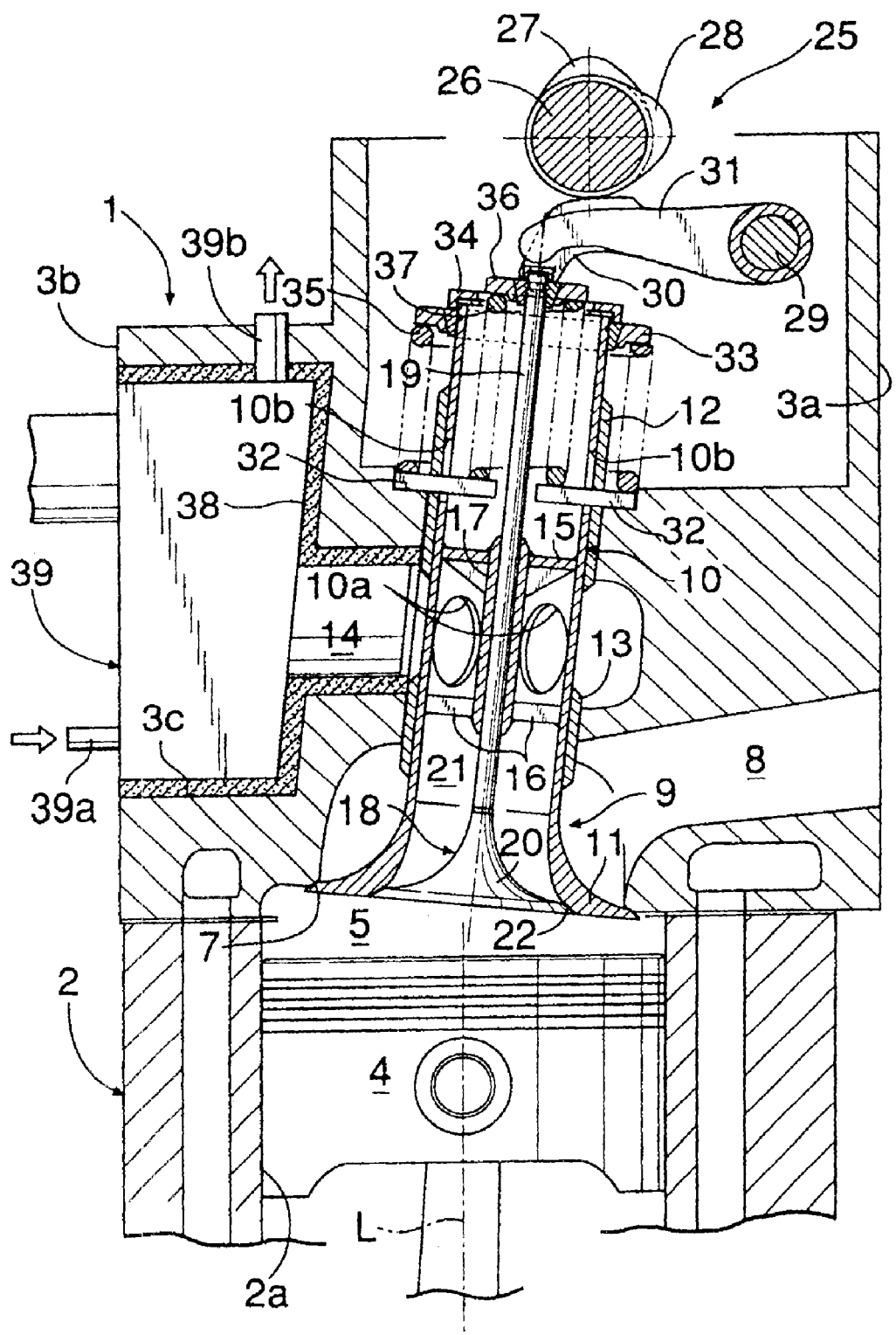
FIG. 10 is a vertical cross section of a cylinder head part of an internal combustion engine related to a third embodiment.

A third embodiment of the present invention is now explained by reference to FIG. 10.

The third embodiment is a modification of the second embodiment, and an intake valve 9 and an exhaust valve 18 are inclined, relative to a cylinder axis L, toward an intake port 8 of a cylinder head 3. As a result, a space can be secured on an exhaust port 14 side of the cylinder head 3, and it is therefore possible to increase the size and capacity of the evaporator 39 by utilizing this space, or reduce the overall size of the cylinder head 3 by using the evaporator 39 with an unchanged size. Furthermore, making the evaporator 39 closer to the vicinity of the combustion chamber 5 makes it possible to recover waste heat in a state in which the exhaust heat is maintained at high temperature, thereby increasing the recovery efficiency.

Figure 11:
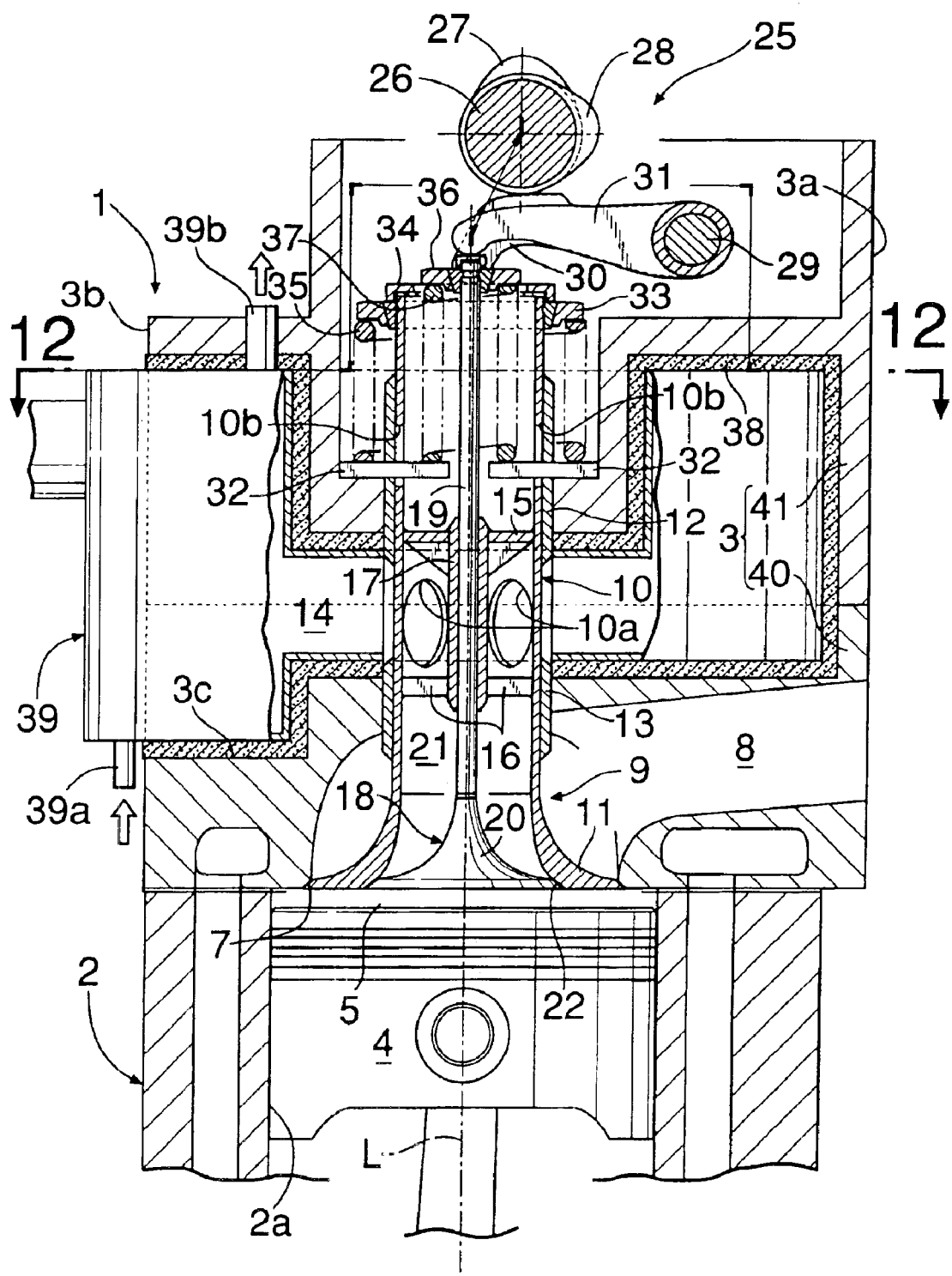
FIG. 11 and FIG. 12 illustrate a fourth embodiment.
Figure 12:
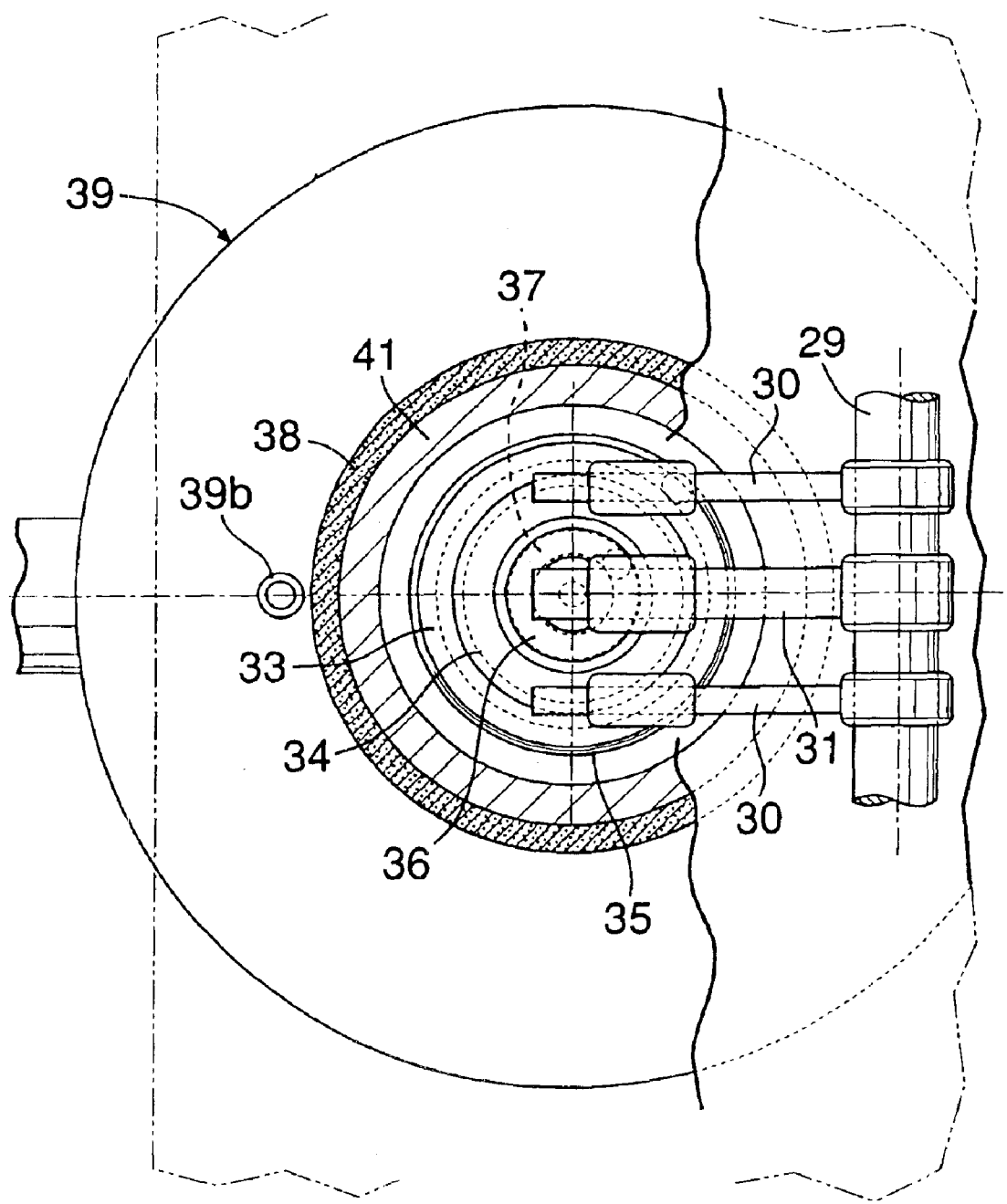

A fourth embodiment of the present invention is now explained by reference to FIG. 11 and FIG. 12.

The fourth embodiment is a modification of the second embodiment, and an evaporator 39 is made in an annular form and disposed so as to surround an intake valve 9, thereby greatly increasing the capacity of the evaporator 39. In order to ease assembly of the evaporator 39, the cylinder head 3 can be divided into two members, that is, a lower cylinder head 40 and an upper cylinder head 41. Although heat of the exhaust gas flowing through an exhaust passage 21 within the intake valve 9 dissipates radially outward, the evaporator surrounding the periphery of the intake valve 9 can block the dissipation of heat, thereby further increasing the waste heat recovery effect.

Although embodiments of the present invention are explained in detail above, the present invention can be modified in a variety of ways without departing from the spirit and scope thereof.

For example, the embodiments illustrate a single-cylinder internal combustion engine 1, but the present invention can also be applied to a multi-cylinder internal combustion engine. Furthermore, the embodiments illustrate an evaporator 39 of a Rankine cycle system as a heat exchanger, but it is possible to employ any type of heat exchanger.

INDUSTRIAL APPLICABILITY

The present invention can be applied to an internal combustion engine, which is represented by a gasoline engine, but its application is not limited.

What is claimed is:

1. An internal combustion engine comprising:
a cylinder head;
a combustion chamber facing the cylinder head;
an intake port formed in the cylinder head;
an intake valve hole formed in the cylinder head and providing communication between the intake port and the combustion chamber;
an intake valve supported in the cylinder head and opening and closing the intake valve hole;
an exhaust passage formed axially within the intake valve;
an exhaust valve hole formed in the intake valve and providing communication between the exhaust passage and the combustion chamber;
an exhaust valve coaxially supported within the intake valve and opening and closing the exhaust valve hole;
an exhaust port formed in the cylinder head and communicating with the exhaust passage; and
a heat exchanger disposed in the exhaust port.

2. The internal combustion engine according to claim 1, wherein the heat exchanger is supported in a recess formed on a side of the cylinder head.

3. The internal combustion engine according to claim 1, further comprising a heat insulator disposed between the cylinder head and the heat exchanger.

4. The internal combustion engine according to claim 1, wherein the intake valve and the exhaust valve are inclined relative to a cylinder axis.

5. The internal combustion engine according to claim 1, wherein the intake valve and the exhaust valve are coaxially arranged above a cylinder axis.

6. The internal combustion engine according to claim 1, wherein the exhaust port and the intake port are formed on opposite sides of the intake and the exhaust valves.

7. The internal combustion engine according to claim 1, wherein the heat exchanger is made in an annular form and disposed so as to surround the intake valve.

8. The internal combustion engine according to claim 7, wherein the cylinder head is formed by an upper cylinder head and a lower cylinder head.

9. The internal combustion engine according to claim 8, wherein the heat exchanger is disposed between the upper cylinder head and the lower cylinder head.

10. The internal combustion engine according to claim 1, wherein the exhaust port and the intake port being formed on opposite sides of the intake and the exhaust valves and extending in a direction substantially orthogonal to cylinder axis.

11. The internal combustion engine according to claim 10, wherein the intake valve and the exhaust valve are coaxially arranged along the cylinder axis.

12. The internal combustion engine according to claim 1, wherein a spring for biasing the exhaust valve in a valve closing direction is provided to be retained on a valve seat and a member for guiding an exhaust gas from the combustion chamber to the exhaust port is provided below the valve seat.

13. The internal combustion engine according to claim 1, wherein said member for guiding the exhaust gas is fixed to a stem of the intake valve and a valve guide for the exhaust valve.

14. The internal combustion engine comprising:
a cylinder head;
a combustion chamber facing the cylinder head;
an intake port formed in the cylinder head;
an intake valve hole formed in the cylinder head and providing communication between the intake port and the combustion chamber;
an intake valve supported in the cylinder head and opening and closing the intake valve hole;
an exhaust passage formed axially within the intake valve;

an exhaust valve hole formed in the intake valve and providing communication between the exhaust passage and the combustion chamber;

an exhaust valve coaxially supported within the intake valve and opening and closing the exhaust valve hole; and an exhaust port formed in the cylinder head and communicating with the exhaust passage, the exhaust port and the intake port being formed on opposite sides of the intake and the exhaust valves and extending in a direction substantially orthogonal to cylinder axis, wherein the intake valve and the exhaust valve are inclined relative to the cylinder axis.

\* \* \* \* \*

UNITED STATES PATENT AND TRADEMARK OFFICE
CERTIFICATE OF CORRECTION

PATENT NO. : 6,971,344 B2
DATED : December 6, 2005
INVENTOR(S) : Makoto Hirano

It is certified that error appears in the above-identified patent and that said Letters Patent is hereby corrected as shown below:

<u>Title page,</u>
Item [75], Inventor, change "HIrano" to -- Hirano --.
Item [30], Foreign Application Priority Data, change "2002295423" to -- 2000-295423 --.

Signed and Sealed this

Eighteenth Day of April, 2006

JON W. DUDAS
*Director of the United States Patent and Trademark Office*